United States Patent [19]

Schwengel, deceased

[11] Patent Number: 5,030,175
[45] Date of Patent: Jul. 9, 1991

[54] CHAIN JOINT CONSTRUCTION

[75] Inventor: Kenneth J. Schwengel, deceased, late of Morganton, N.C., by Karen L. Schwengel, executrix

[73] Assignee: Rexnord Corporation, Milwaukee, Wis.

[21] Appl. No.: 429,855

[22] Filed: Oct. 31, 1989

[51] Int. Cl.⁵ ............................................. F16G 13/06
[52] U.S. Cl. ..................................... 474/214; 474/230
[58] Field of Search ............... 474/206, 207, 209, 219, 474/220, 226, 227, 228, 232–234, 202, 230, 231, 214

[56] References Cited

U.S. PATENT DOCUMENTS

| | | | |
|---|---|---|---|
| 1,737,823 | 12/1929 | Bodle | 474/219 X |
| 2,751,791 | 6/1956 | Harris et al. | 474/219 X |
| 3,062,067 | 11/1962 | Deming | 474/230 |
| 3,068,712 | 12/1962 | Kuntzmann | 474/207 |
| 3,620,093 | 11/1971 | Crowson | 474/230 |
| 3,754,477 | 8/1973 | Bonifas | 474/230 |
| 4,424,050 | 1/1984 | Sato | 474/231 |
| 4,747,261 | 5/1988 | Frenker-Hackfort | 59/84 |

*Primary Examiner*—Ramon S. Britts
*Assistant Examiner*—David J. Bagnell
*Attorney, Agent, or Firm*—Robert A. Brown

[57] ABSTRACT

A chain link assembly is fabricated from a plurality of links joined together in articulated relationship with each of the links having a first end with a complementary pitch opening and a second end with a complementary opening. A barrel having an inside diameter surface greater than the cross-sectional diameter of the complementary pitch opening and having milled end segments which extend through the shell of the barrel to provide flat surfaces which permit the milled end segments of the barrel to be press fit into the complementary pitch opening. A pin member having a cross-sectional diameter substantially less than the inside barrel diameter is positioned through the complementary opening in the second end of the links to complete the chain link assembly. The completed chain link assembly provides a one-piece outer circumferential bearing surface on the barrel throughout the entire angle of articulation.

14 Claims, 2 Drawing Sheets

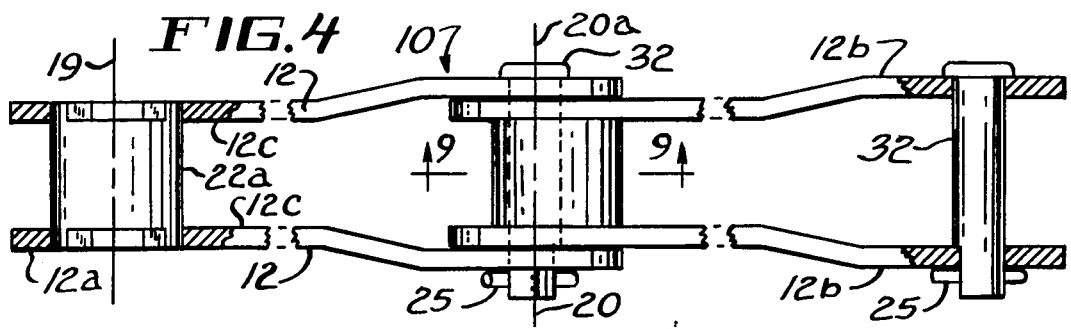
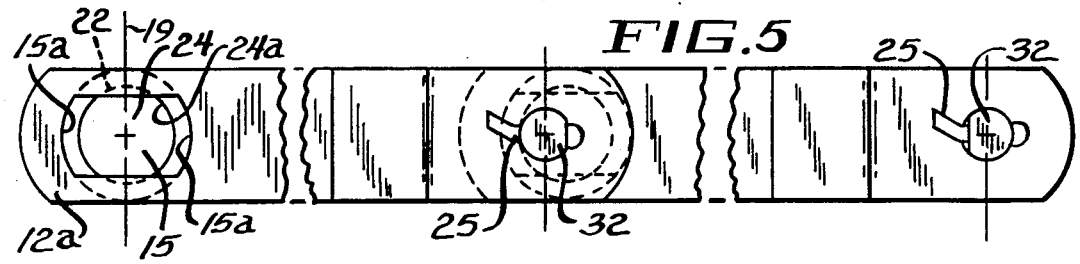
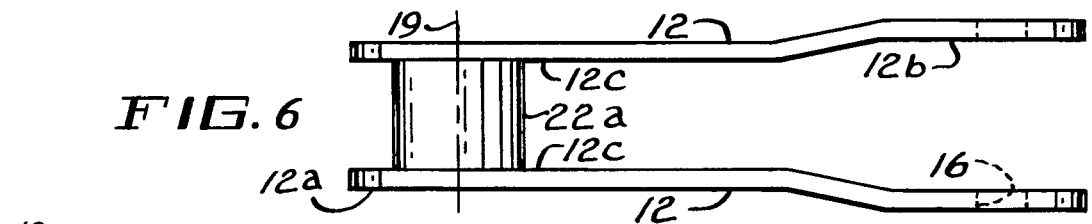
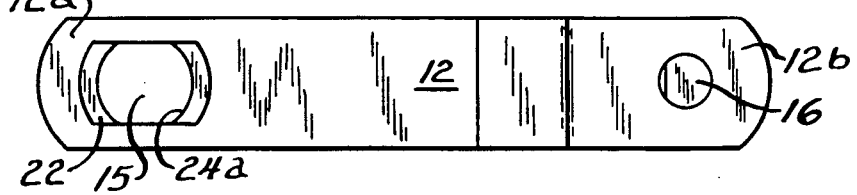
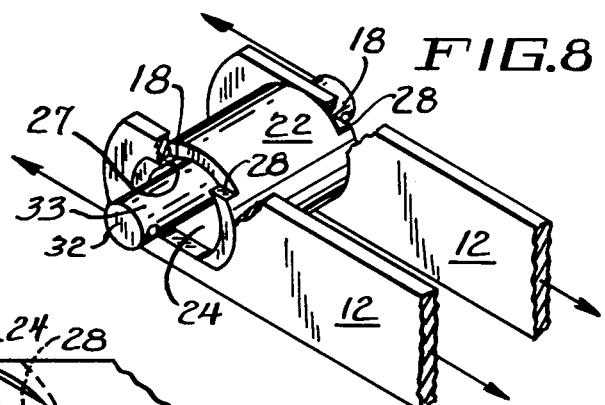
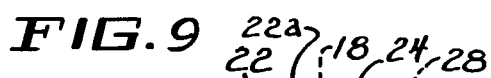
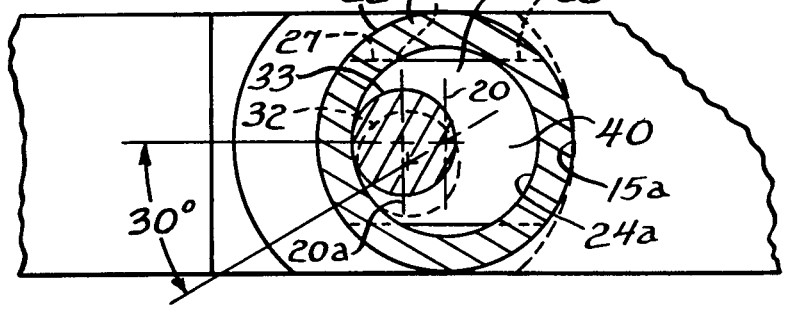

CHAIN JOINT CONSTRUCTION

BACKGROUND OF THE INVENTION

The present invention relates to chain link assemblies and more particularly to an improved bushing structure for use in a chain link assembly which permits the combination of a bushing and roller into one element and which provides full joint bearing areas throughout the angle of flexure required for the engagement of the chain link assembly with a driving sprocket.

At present, chain link assemblies are made by welding, casting or otherwise fixedly securing one-piece bushings or barrels to the sidebars which form the closed end of the chain link assembly. The number of links, as required or desired, are joined together in tandem fashion to form the chain assembly by inserting a pin through the barrel at its closed end of the first link to complete the chain link assembly.

Bushed chain link assemblies are at present completed and made by fixedly securing one-piece bushings to the first ends of sidebars containing a double-D pitched openings therein. The present used milled barrels include an inside diameter bore which will matingly and snugly receive the outside diameter of a pin inserted therethrough. In such constructions, the milled end dimension of the ends of the bushings are greater than the inside diameter of the bushing, a structure which permits material to enter into the space between the outside diameter of the pin and the inside diameter of the barrel, thus resulting in increased wear when the chain assemblies are employed handling heavy loads under severe operating conditions. The rapid wear of such links and the attendant costs in replacing the worn chain links is undesirable.

In welded chain link assemblies, the working inside width of the chain, which is defined as the width of the barrel or backing between the sidebars, is reduced by the thickness of the weld which secures the ends of the barrel to the inside surface of the sidebars. Thus, such welded chain assemblies are either wider than required or the inside width of the sprocket contact is less, such that there is not full bushing link contact during chain link articulation about the drive sprocket. Additionally, in such welded steel chain assemblies, there are pockets formed between the outside barrel surface and the sidebar pitch hole. These pockets tend to receive and to pack the conveyed material which can jam and freeze the chain joint thereby preventing articulation around the drive sprockets. Furthermore, in such welded steel chain link assemblies the material selection for the barrel or bushing and the material selected for the sidebar is limited to the same or a similar material because of the welding requirements of the material. Also, the problem of weld joint susceptibility to embrittlement, grain size growth, corrosion and fatigue are problems encountered with the use of welded chain link assemblies. Finally, welded constructions lack inherent positive alignment of the sidebars relative to each other because they are fixed by welding. Accordingly, such welded chain links cannot be disassembled and prevents the replacement of worn barrels with new barrels.

Chain link assemblies made by casting have been suggested and are used in industry, but such cast designs require that the same or single material be used for casting the entire link, comprised of sidebars and the barrel or bushing. Accordingly, such cast designs are therefore limited to specific castable materials, which materials do not provide the desired increased wear area of the overall barrel width and do not provide the desired angle of articulation about the drive sprocket. Moreover, such cast assemblies prevent the replacement of worn links and the rebuilding of chain assemblies as wear recurs.

U.S. Pat. No. 4,129,045 to K. Kishitani shows a replaceable cover surrounding each bushing for protecting the external surface of the bushing from wear. However, such an assembly fails to provide for the necessary clearance between the pin and the inside diameter of the bushing and requires a complex retaining means for anchoring each of the covers in place about each of the bushings.

SUMMARY OF THE INVENTION

Accordingly, it is a primary object of the present invention to provide a novel chain link assembly and method of constructing such a chain link assembly which combines the bushing, barrel and roller into one element. The resultant chain link assembly provides a full joint bearing area throughout the angle of flexure when the tooth of a drive sprocket engages the barrel of the chain link assembly. This object is achieved by positioning a barrel between complementary sidebars which contain complementary pitch openings of a reverse double-D configuration. The barrel includes an inside diameter greater than the perpendicular diameter of the complementary pitch opening in the sidebar and includes milled segments which are of a length substantially the same as the thickness of the sidebars. The milled end segments, extending through the side wall of the barrel, provide for corresponding flat surface end portions which are press fit into the complementary pitch openings to fixedly secure the barrel to the sidebars. The sidebars and links are joined together by inserting a pin through the bore of the barrel to complete the chain assembly, as desired.

Another object of the present invention is to utilize a barrel or bushing having an enlarged inside diameter bore therethrough and a smaller dimensioned pin which provides tor extra clearance between the outside circumferential surface of the pin and the inside circumferential surface of the bushing to prevent freeze-up due to material build up during usage of the chain assembly.

A further object of the present invention is to provide a chain link assembly having an enlarged internal diameter tubular bushing or barrel which provides for a full transverse bearing area extending between the sidebar elements which correspondingly provides for a chain link assembly which may be narrower in construction while providing the same degree of contact between the barrel and the teeth of a drive sprocket.

Still another object of the present invention is to provide a drive chain link assembly which permits the use of dissimilar materials, enhances material selection for the barrel and sidebars that is not dependent upon the weldability or the castability of the sidebar or barrel materials.

Yet another object of the present invention is a novel chain link assembly which provides for positive alignment of the sidebars relative to each other to insure the chain is straight, true and free of twists.

The chain link assembly in accordance with the present invention is comprised of a plurality of sidebars with each of the sidebars formed generally in the shape of a parallelepiped and having first end portions angled obliquely inwardly for a predetermined distance and thereafter bent forwardly to assume a straight length to provide a forward or first end portion. Each of the forward end portions of the sidebars include complementary pitch openings containing oppositely disposed chordal segments joined by top and bottom flat portion therebetween, with each of the sidebars having a rearward second end portion bent rearwardly from the first end portion to assume a straight length, with each of the second end portions including complementary circular openings therein. The bushing, barrel, or roller is positioned between each of the sidebars substantially normal thereto at the forward or first end portion of the sidebars. The barrel includes a bore formed therethrough and the barrel possesses an inside diameter greater than the perpendicular diameter of the complementary pitch opening in the sidebars. The complementary pitch openings are substantially of a reversed double-D configuration. The barrel includes milled end segments which are substantially the same length as the thickness of each of the sidebars. The milled end segments extend through the outside diameter wall of the barrel to provide a corresponding flat surface to permit the press fitting of the milled end segments of the barrel to be press fit into the complementary pitch openings on the sidebars to fixedly secure the barrel to the end portions of the sidebars. A pin is adapted to be fitted into and through the bore of the barrel to couple the chain link assembly together in tandem. The cross-sectional diameter of the pin is substantially less than the diameter of the bore of the barrel to provide the proper geometric relationship of the bushing inside diameter, the flat height of the pitch opening and the pin diameter to achieve and provide for the full joint bearing contact over the required angle of articulation when the barrel engages a tooth of a drive sprocket. The resultant link assembly provides full bushing length bearing contact over the entire angle of joint articulation.

The present invention and method of constructing the chain link assembly permits the selection of dissimilar materials, such as for example, carbon steel, stainless steel, tool steel, plastic or bronze, to be utilized in making the sidebar or the barrel, respectively. Thus, the problems of weld joint susceptibility to embrittlement, grain size, corrosion and fatigue are eliminated with the present invention.

DESCRIPTION OF THE DRAWINGS

The forgoing description and other characteristics, objects, features and advantages of the present invention will become more apparent upon consideration of the following detailed description, having reference to the a wherein:

FIG. 4 is a top view of a pair of chain link assemblies constructed and assembled in accordance with the present invention;

FIG. 5 is a side view of a pair of chain link assemblies in accordance with the present invention, as shown in FIG. 4;

FIG. 6 is a top view of a single chain link in accordance with the present invention;

FIG. 7 is a side view of the single chain link in accordance the present invention, as shown in FIG. 6;

FIG. 8 depicts the barrel and pin in accordance with the present invention; and

FIG. 9 is a sectional view taken along line 9—9 of FIG. of the link assembly in accordance with the present invention.

DESCRIPTION OF THE PREFERRED EMBODIMENTS

Figure 2:
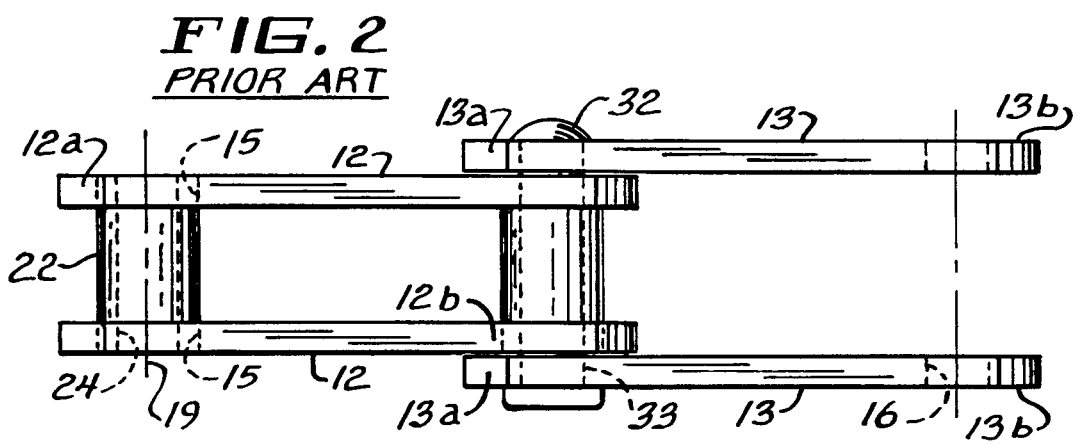
FIG. 2 is a top view of a pair of chain link assemblies in accrodance with the prior art.
Figure 3:
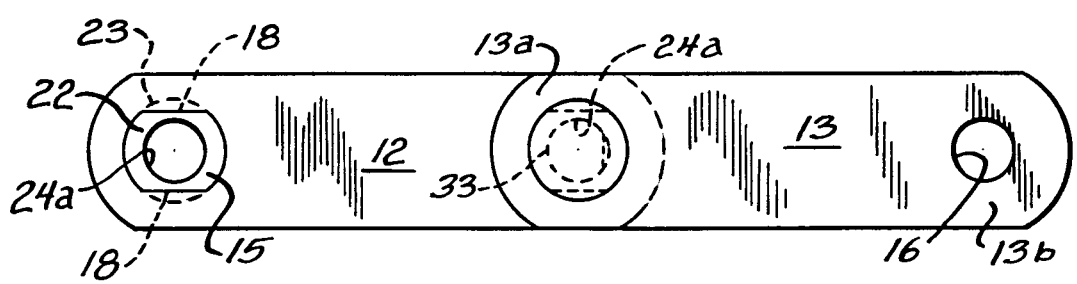
FIG. 3 is a side view of the chain link assemblies in accordance with the prior art, as shown in FIG. 2.

Referring now to the drawings wherein like numbers have been used throughout the several views to designate the same or similar parts, a chain link is generally identified by the reference numeral 10. In the prior art chain link construction, as represented and shown in FIGS. 1-3, the chain link 10 comprises a pair of sidebars 12 formed generally in the shape of a solid rectangle. Each sidebar 12 has pitch openings 15 formed at each of its outer ends 12a and 12b. The openings 15 are disposed oppositely from each other along a longitudinal coincident axis 19 when the sidebars 12 are aligned in parallel relationship. The pitch openings 15 in sidebars 12 are generally of a reverse double-D configuration which are adapted to receive a bushing, barrel or roller 22 which is disposed or positioned between the sidebars 12 and generally perpendicular or normal thereto. Barrel 22 has a bore 24 formed therethrough and the bore 24 of the barrel has a longitudinal axis that is coincidental with the longitudinal axis 19 of the apertures 15. The barrel 22 includes a top and bottom milled end flat portion 18 at each of its outer ends (FIG. 3). The top and bottom milled end flat portions cut away the outer circumferential surface of the barrel 22, but stop short of extending through the sidewall of the barrel, as shown in FIG. 3. The milled ends 18 of the barrel 22 permit the press fitting of the ends of the barrel 22 into the pitch openings 15 in the sidebars 12 about each of the bushings, as is known in the art and shown in FIG. 1.

Figure 1:
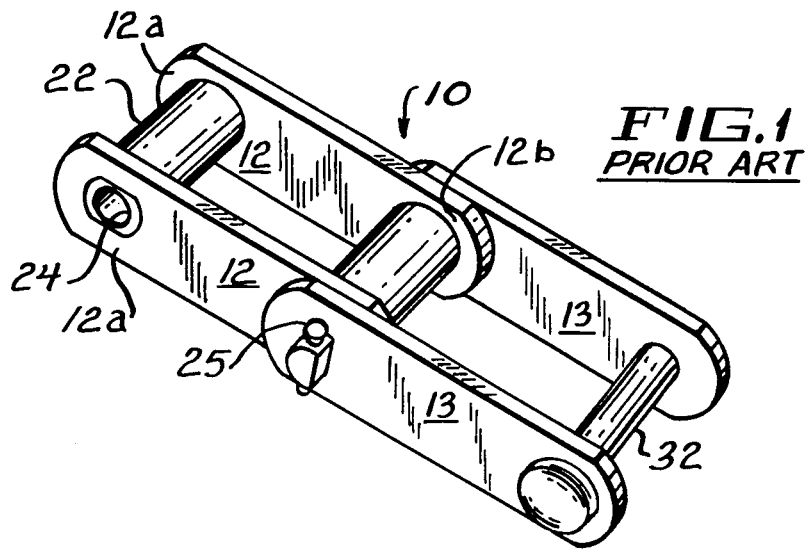
FIG. 1 depicts a pair of chain link assemblies in accordance with the prior art.

Sidebars 13 formed generally in the shape of a solid rectangle are provided and include apertures 16 formed at their outer ends 13a and 13b. The apertures 16 are disposed and sized to cooperate with a pin 32 that is adapted to be fitted through the apertures 16 of the respective sidebars 13 and through the bore 24 of the barrel 22 in a staggered offset relationship to secure the chain links together, as shown in FIG. 1. Importantly, the bore 24 of barrel 22 is dimensioned such that its inside diameter 24a is only slightly larger than the outside diameter 33 of the pin 32 to provide a snug fit therearound. As shown in FIG. 3, the outside diameter surface 23 of the barrel 22 is only slightly larger than the pitch openings 15 in the sidebars 12. The pin 32 is held in position by a retaining means or cotter key 25 (FIG. 1), as is well known in the art. Because of the snug and close fit between the outside circumferential surface 22 of the pin 32 and the inside circumferential surface 24a of the barrel 22, the conveyed materials which enter into this space between the outside diameter of the pin and the inside diameter of the barrel result in increased abrasive wear between the pin and barrel when such chain assemblies are employed handling heavy loads under severe operating conditions. Under such operating conditions, the chain assembly may jam and freeze and prevent articulation around a drive sprocket (not shown) thereby limiting and reducing the durabilit.y and wearability of such link chain assemblies. Moreover, in the overlapping assembly of such prior art drive assemblies wherein the sidebars 12 are staggered in an overlapped mounting assembly with respect to the sidebars 13, as shown in FIG. 1, the resultant chain assembly 10 lacks the positive alignment of the sidebars relative to each other. Also, such structures do not possess the proper geometric relationship between the bushing inside diameter surface and the outside pin diameter surface to achieve full joint bearing contact over the entire angle of articulation.

Referring now to the chain link assembly 10 in accordance with the present invention, as shown in FIGS. 4-9, the chain link assembly 10 comprises a pair of sidebars 12 formed generally in the shape of a solid rectangle or parallelepiped, each sidebar having a portion nearer one of its ends being bent inwardly or obliquely for a predetermined length and then being bent forward to provide a first end 12a to assume a straight length portion parallel to its other end 12b. The two sidebars 12 are placed parallel and spaced apart from each other having their first ends 12a spaced apart a distance less than that separating the sidebars at their second ends 12b. Each sidebar includes pitch openings 15 disposed oppositely from each other along a longitudinal coincident axis 19 when the sidebars are aligned in parallel relationship as shown in FIGS. 4, 5 and 7. The pitch openings 15 are generally of a reversed double-D configuration, with the openings 16 on the opposite end 12b being circular in shape and adapted to receive a pin 32, as will hereinafter be described.

A bushing, barrel or roller 22 is positioned between the sidebars 12 generally perpendicular and normal to the first ends 12a of the sidebars 12. The outer ends of the barrel are securely and fixedly mounted into the pitch openings 15 in the sidebars 12, as will hereinafter be discussed. The barrel 22 is of such a configuration to combine the bushing and roller into one element and to provide for the press fitting of the milled end segments of the bushing flat into the pitch openings 15. The barrel 22 is tubular in shape and has a bore 24 extending and formed therethrough. The bore 24 of the barrel 22 has a longitudinal coincident axis 20 of the pitch openings 15 when the barrel is securely disposed between the sidebars 12. The barrel 22 includes at each end milled end segment 18 which has a depth from each distal end thereof which is substantially the same as the thickness of the sidebars 12. The milled end segments 18 extend through the thickness of the barrel 22, or through the hollow inside diameter of the barrel, to provide corresponding planar surfaces 27 and 28 which permit the press fitting of the milled end segments 18 into the complementary shaped pitch openings 15 to fixedly secure the barrel to the first end portions 12a of the sidebars 12, as is shown in FIGS. 6-9. A pin 32 is provided to connect together a plurality of links 10 to form an articulated joint between and among the link assemblies. The pins 32 join a series of links in a tandem relationship to form an endless chain of any desired length, as shown in FIGS. 4 and 5. The pin 32 is adapted to be fitted through the complementary openings 16 in the second end portion 12b of the respective sidebars 12 and into and through the bore 24 of the barrel 22 mounted in the first end portion of the sidebar 12. When the pin is secured thereto as shown in FIG. 4, a cotter key or other retaining means 25 is provided to secure and complete the chain assembly.

As shown in FIGS. 8 and 9, the relationship between the pin 32, the barrel 22 and the pitch openings 15 in sidebar 12 is shown. The inside diameter surface 24a of the barrel 22 has a diameter that is substantially greater than the perpendicular diameter of the complementary pitch openings 15. The milled end segments 18 of the barrel 22 define a complementary reverse double-D configuration which permits the milled end segments 18 of the barrel to be press fit within the complementary pitch openings 15 and sidebars 12. The milled end segments 18 extend through and fit snugly within the sidewall of the barrel 22. Accordingly, when the barrel is positioned into the pitch openings 15 between the sidebars 12 and a plurality of chain link assemblies are assembled and used, any material that enters the joint can easily exit the interior of the joint because of the additional space provided within the inside diameter of the barrel and the smaller cross-sectional diameter pin. This structure eliminates jamming or freezing and insures proper articulation around the drive sprocket.

As shown in FIG. 9, the present invention provides a continuous one-piece outer circumferential bearing surface 22a on the barrel 22, throughout the entire length of a chain and throughout the entire angle of articulation, which extends up to about 30° from the horizontal plane of the chain. Moreover, the longitudinal axis 20 of the bore of the barrel is aligned and parallel with the longitudinal axis 20a of the pin 32. Moreover, in the completed assembled condition, as shown in FIG. 4, a full transverse bearing area 22a (FIG. 4) extends from the inside surfaces 12c of the sidebars 12 across the chain joint. This overcomes the problems of conventional welded designs where there is present no full pin bushing contact between the outside surface of the barrel and the sidebars. This lack of contact is caused by the sizing and tolerances of a welded barrel diameter that requires a portion of the connection between the welded barrel and the inside surface of the sidebar to accommodate the weld material. Thus, the available chain width contact surface provided in welded designs is narrower or less than the same sprocket contact width of a chain link assembly made in accordance to the present invention.

As shown in FIG. 9, the cross sectional diameter of the pin 32 is approximately one-half the inside diameter of the barrel 22. The additional space 40 provided within the barrel 22 about the pin 32 permits that any material entering within the joint assembly may exit therefrom thereby eliminating jamming or freezing of the joint assembly during operation. The present invention further eliminates any welding necessary to complete the joint assembly. This design allows the user of the present invention to predeterminately select the particular material from which to fabricate the barrels or sidebars. For example, the barrel may be composed of stainless steel while the sidebars are composed of carbon steel, or the sidebars may be case hardened carbon steel, or tool steel, while the barrel is composed of a plastic or other high tensile strength material, or the barrel may be composed of stainless steel with the sidebars being of high strength plastic or bronze or any combination thereof of such high tensile strength materials that are available and well known in the industry. This increased selection and interchangeability of materials for use in fabricating barrels and sidebars for the chain assembly eliminates the problems of weld joint susceptibility to embrittlement, grain size growth corrosion and fatigue, problems that are present with existing chain link assemblies.

It is within the scope of the present invention that the press fitting of the milled segment ends of the barrel into the complementary pitch openings in the sidebar does not require the full press fit around the entire outside diameter of the bushing. That is, as shown in FIGS. 5 and 8-9, the engagement of the milled end segments 18 into the pitch opening 15 provides contact between the barrel and pitch opening along substantially vertically curved surfaces 15a of the pitch opening 15.

While the present invention has been described with reference to the above preferred embodiments, it will be understood by those skilled in the art, that various changes may be made and equivalence may be substituted for elements thereof without departing from the scope of the present invention. In addition, modifications maybe made to adapt a particular situation or material to the teachings of the present invention without departing from the scope of the present invention. Therefore it is intended that the invention not be limited to the particular embodiments disclosed for carrying out this invention, but that the present invention includes all embodiments falling within the scope of the appended claims.

I claim:

1. A chain link assembly comprising:
    first and second sidebars, with each of said sidebars formed substantially in the shape of a parallelepiped and having a first end portion angled obliquely inwardly for a predetermined distance and thereafter bent forwardly to assume a straight lenght of the first end portion, with each of said first end portions of each of said sidebars including complementary pitch openings having oppositely disposed chordal segments joined by flat portions therebetween, with each of said sidebars having a second end portion bent rearwardly from said first end portion to assume a straight length of the second end portion, with each of said second end portions including complementary circular opening therein;
    a barrel positioned between said sidebars substantially normal thereto at said first end portion, said barrel having a bore formed therethrough and an inside diameter greater than a perpendicular diameter of said complementary pitch openings, said barrel including milled end segments having thickness substantially the same as a thickness of said sidebars, with said milled end segments extending beyond said barrel to provide a corresponding flat surface complementary to said flat portions of said pitch openings to permit the press fit of the milled end segments into said complementary pitch openings to fixedly secure said barrel to said first end portions of said sidebars, and
    a barrel positioned between said sidebars substantially normal thereto at said first end position, said barrel having a bore formed therethrough and an inside diameter greater than a perpendicular diameter of said complementary pitch openings, said barrel including milled end segments having thickness substantially the same as a thickness of said sidebars, with said milled end segments extending beyond said barrel to provide a corresponding flat surface complementary to said flat portions of said pitch openings to permit the press fit of the milled end segments into said complementary pitch openings to fixedly secure said barrel to said first end portions of said sidebars, and
    a pin having a diameter substantially smaller than said diameter of said bore of said barrel to provide substantial space between an outer circumferential surface of said pin and a circumferential surface of said bore adapted to be fitted through said complementary openings in said second end portion of respective sidebars and into said bore of said barrel mounted in the first end portion of respective sidebar, with said pin secured thereto to complete the chain link assembly,
    whereby during operation of the chain assembly contact between said pin and said bore of the barrel provides a continuous one piece outer circumferential bearing surface against the barrel and permits material entering said space between said pin and said bore to exit therefrom.

2. The chain link assembly in accordance with claim 1 wherein the diameter of said bore of said barrel is substantially twice the cross-sectional diameter of said pin.

3. The chain link assembly in accordance with claim 2 wherein the longitudinal axis of said bore of said barrel is aligned parallel with the longitudinal axis of the pin in the complete chain link assembly.

4. The chain link assembly in accordance with claim 1 wherein an articulated joint between said barrel and said pin provides full joint bearing contact of between about 0-30°joint flexure angle.

5. The chain link assembly in accordance with claim 1 wherein the material composition of either said barrel or said sidebars may be selected from a group comprising carbon steel, case hardened steel, stainless steel, plastic, bronze, tool steel or other high tensile strength material.

6. The chain link assembly in accordance with claim 1 wherein the outside diameter of said barrel is substantially equal to the perpendicular height of said first and second sidebars.

7. The chain link assembly in accordance with claim 1 wherein said continuous one piece outer circumferential bearing surface against the barrel is maintained through an entire angle of articulation.

8. In chain link assembly of the type having a plurality of overlapping links comprised of first and second sidebars, with each of said sidebars formed substantially in the shape of a parallelepiped and having a first end portion containing complementary pitch openings therein, said pitch openings having oppositely disposed chordal segments joined by flat portions therebetwee, with each of the first and second sidebars having a second end portion with complementary circular openings therein; a barrel means positioned between said first end position of said first and second sidebars and a pin means adapted for insertion through the complementary circular openings in the second end portions of the first and second sidebars, the improvement comprising:
    wherein said barrel means includes a bore formed therethrough. with said barrel means having an inside diameter greater than a cross-sectional diameter of the complementary pitch openings and including milled end segments which extend through said barrel means to provide a corresponding flat portion surface to permit the press fitting of the milled ends into the complementary pitch openings, and
    wherein said pin means has a cross-sectional diameter substantially less than the inside diameter of said barrel means so as to provide substantial space therebetween whereby said pin maintains point contact with said bore and permits material to exit from said space between said pin and said bore.

9. The chain link assembly in accordance with claim 8 wherein the diameter of said bore of said barrel means is substantially twice the cross-sectional diameter of said pin means.

10. The chain link assembly in accordance with claim 8 wherein the longitudinal axis of said bore of said barrel means is aligned parallel with the longitudinal axis of the pin means in the completed chain link assembly.

11. In the chain link assembly in accordance with claim 8 wherein an articulated joint between said barrel means and said pin means provides full joint bearing contact of between about 0-30° joint flexure angle.

12. The chain link assembly in accordance with claim 8 wherein the material composition of either said barrel means or the sidebars may be selected from a group comprising carbon steel, case hardened steel, stainless steel, plastic bronze, tool steel or other high tensile strength material.

13. The chain link assembly in accordance with claim 8 wherein an outside diameter of said barrel means is substantially equal to an perpendicular height of the first and second sidebars.

14. The chain link assembly in accordance with claim 8 wherein said angle of articulation extends to at least thirty degrees from the horizontal plane of the assembly.

* * * * *